United States Patent
Goriawala et al.

(10) Patent No.: US 9,744,482 B2
(45) Date of Patent: Aug. 29, 2017

(54) SCREEN DECANTER FOR SCREENING SOLIDS FROM WASTE WATER

(71) Applicant: ClearCove Systems, Inc., Victor, NY (US)

(72) Inventors: Qausarali Goriawala, Rochester, NY (US); Alfred Bertoni, Fairport, NY (US); Jonathan M. Jacobs, Rochester, NY (US); Michael A. Butler, Webster, NY (US); Terry Wright, Rochester, NY (US)

(73) Assignee: ClearCove Systems, Inc., Victor, NY (US)

(*) Notice: Subject to any disclaimer, the term of this patent is extended or adjusted under 35 U.S.C. 154(b) by 0 days.

(21) Appl. No.: 14/984,206

(22) Filed: Dec. 30, 2015

(65) Prior Publication Data

US 2016/0107104 A1    Apr. 21, 2016

Related U.S. Application Data

(63) Continuation-in-part of application No. 14/471,247, filed on Aug. 28, 2014, now abandoned, and a
(Continued)

(51) Int. Cl.
| | |
|---|---|
| *B01D 21/00* | (2006.01) |
| *B01D 21/24* | (2006.01) |
| *B01D 21/34* | (2006.01) |

(52) U.S. Cl.
CPC ..... *B01D 21/2444* (2013.01); *B01D 21/0006* (2013.01); *B01D 21/0012* (2013.01);
(Continued)

(58) Field of Classification Search
None
See application file for complete search history.

(56) References Cited

U.S. PATENT DOCUMENTS

| 2,401,745 A | 6/1946 | Brown |
| 2,799,396 A | 7/1957 | Belaskas |
| (Continued) | | |

FOREIGN PATENT DOCUMENTS

| EP | 0010395 A1 | 4/1980 |
| EP | 0421265 A1 | 4/1991 |
| (Continued) | | |

OTHER PUBLICATIONS

Communication: Extended EP Search Report for EP 14200235, Dated Jan. 3, 2016, 17 Pages.
(Continued)

*Primary Examiner* — Chester Barry
(74) *Attorney, Agent, or Firm* — Harris Beach PLLC; Neal L. Slifkin; Luis E. Ormaechea

(57) ABSTRACT

A screen decanter for decanting liquid from a reservoir, comprising at least one rack comprising screens and baffles forming the sides of a cavity; a frame attached to the screens and baffles and providing a barrier so that liquid cannot pass from outside into the cavity without passing through the screens; a patterned perforated drain pipe inside the cavity and leading to an opening through which liquids may drain out from the cavity. The pattern of the openings counteracts the hydrostatic head within the rack such that flow through the screens is uniform at all depths of immersion in the liquid reservoir. Preferably, the screens have a porosity of about 50 micrometers.

10 Claims, 4 Drawing Sheets

Related U.S. Application Data continuation-in-part of application No. 14/142,197, filed on Dec. 27, 2013.

(52) U.S. Cl.
CPC .......... *B01D 21/2427* (2013.01); *B01D 21/34* (2013.01); *B01D 2201/087* (2013.01); *C02F 2303/24* (2013.01)

(56) References Cited

U.S. PATENT DOCUMENTS

| | | | |
|---|---|---|---|
| 3,006,474 A | 10/1961 | Elliott | |
| 3,372,715 A | 3/1968 | Ashton | |
| 3,717,257 A | 2/1973 | Boyle | |
| 3,957,655 A | 5/1976 | Barefoot | |
| 3,964,512 A | 6/1976 | Dumas | |
| 3,997,198 A | 12/1976 | Linder | |
| 4,009,106 A | 2/1977 | Smith | |
| 4,192,746 A | 3/1980 | Arvanitakis | |
| 4,202,372 A | 5/1980 | Gibbons | |
| 4,226,714 A | 10/1980 | Furness | |
| 4,367,145 A | 1/1983 | Simpson | |
| 4,405,458 A | 9/1983 | McHugh, Jr. | |
| 4,474,213 A | 10/1984 | Jameson | |
| 4,608,165 A | 8/1986 | Galper | |
| 4,715,570 A | 12/1987 | Mashuda | |
| 5,205,768 A | 4/1993 | Pollack | |
| 5,290,434 A | 3/1994 | Richard | |
| 5,352,356 A | 10/1994 | Murphy | |
| 5,411,633 A | 5/1995 | Phillips et al. | |
| 5,951,878 A | 9/1999 | Astrom | |
| 6,213,515 B1 | 4/2001 | La Terra | |
| 7,025,888 B2 | 4/2006 | Thompson | |
| 7,972,505 B2 | 7/2011 | Wright | |
| 8,225,942 B2 | 7/2012 | Wright | |
| 8,398,864 B2 | 3/2013 | Wright | |
| 8,721,889 B2 | 5/2014 | Conner et al. | |
| 8,875,371 B2 | 11/2014 | Patten et al. | |
| 2003/0164341 A1 | 9/2003 | Use et al. | |
| 2007/0095749 A1 | 5/2007 | Komatsu | |
| 2008/0296228 A1 | 12/2008 | Sauvignet et al. | |
| 2009/0065957 A1 | 3/2009 | Mao et al. | |
| 2009/0095672 A1 | 4/2009 | Wilcher et al. | |
| 2010/0176054 A1 | 7/2010 | Koopmans | |
| 2010/0236999 A1 | 9/2010 | Utsunomiya | |
| 2011/0042844 A1 | 2/2011 | Brown et al. | |
| 2011/0073296 A1 | 3/2011 | Richard et al. | |
| 2011/0278212 A1* | 11/2011 | Tyner ................. | B01D 21/2422 210/170.09 |
| 2012/0261337 A1 | 10/2012 | Weiss | |

FOREIGN PATENT DOCUMENTS

| | | |
|---|---|---|
| EP | 1700963 A1 | 9/2006 |
| GB | 1079809 A | 8/1967 |
| JP | H03 65298 A | 3/1991 |
| JP | 2002001310 A | 1/2002 |
| WO | 2011087936 A2 | 7/2011 |

OTHER PUBLICATIONS

Communication: Partial EP Search Report for EP 15175703, Dated Jul. 1, 2016, 10 Pages.

"Vortex Grit Chamber KD 01.5", Dec. 17, 2013 (Dec, 17, 2013), X P055236807 Retrieved from the Internet: URL: http://www.dwe.dk/files/files/produkter/KD01-5_bro_GB.pdf [retrieved on Dec. 16, 2015] p. 2; figure 1, 2.

Dango & Dienenthal Plate Filter Brochure, 2011, 6 Pages.

* cited by examiner

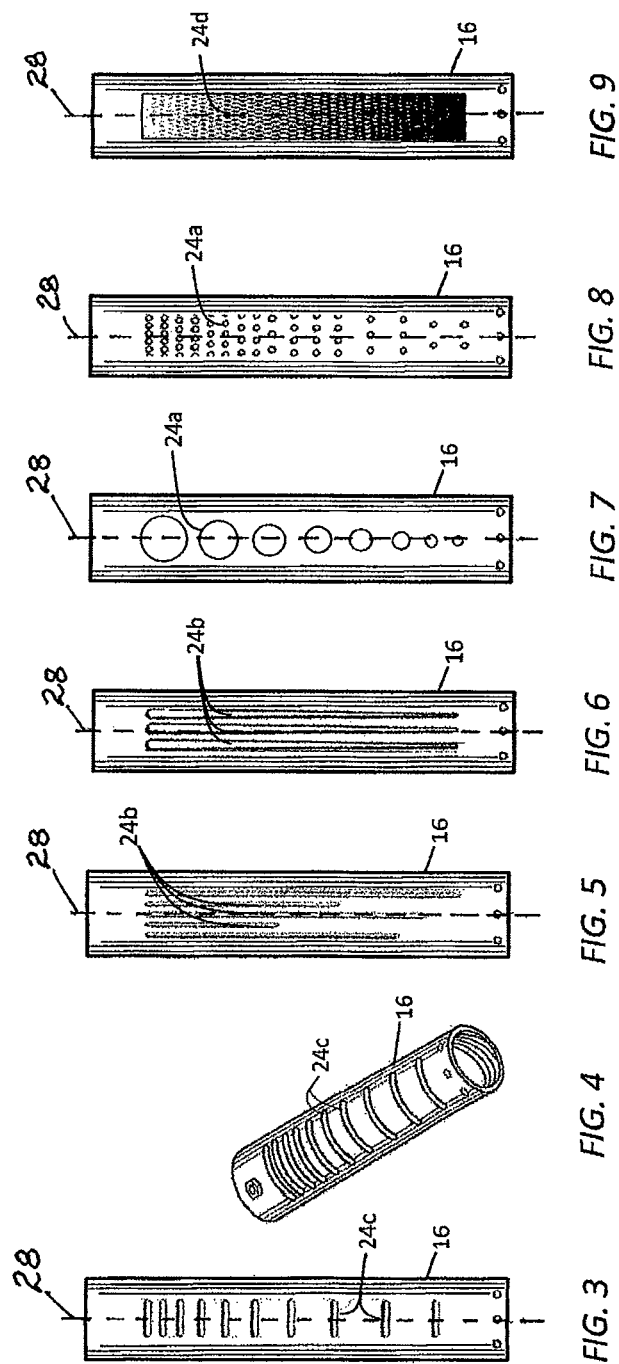

SCREEN DECANTER FOR SCREENING SOLIDS FROM WASTE WATER

CROSS-REFERENCE TO RELATED APPLICATIONS

The present application is a Continuation-In-Part of a U.S. patent application Ser. No. 14/471,247 (the '247 Application), filed Aug. 28, 2014, now abandoned, which is a Continuation-In-Part of a U.S. patent application Ser. No. 14/142,197, filed Dec. 27, 2013 (the '197 Application). All of the foregoing applications are hereby incorporated herein by reference in their entirety for all purposes.

TECHNICAL FIELD

The present invention relates to the field of waste water treatment; more particularly, to a high-capacity waste water treatment system; and most particularly, to apparatus and method for creating uniform effluent flows through microscreens to maximize flow volumes and minimize downtime.

BACKGROUND OF THE INVENTION

In developed and developing countries, primary treatment and disinfection of waste water discharges from collection systems and waste water treatment facilities is the first step to improving water quality. Typically, secondary and tertiary waste water treatment processes are added to provide additional treatment of the primary effluent.

Primary treatment removes large and dense solids via screening and gravitational settling, allowing neutrally-buoyant matter to pass into the secondary treatment process or receiving body of water. Primary treatment utilizing gravitational settling or clarification is recognized as removing 20-33% of the organic load as measured in Biochemical Oxygen Demand (BOD). Secondary treatment removes another 50+% of the organic load by converting the BOD to biomass, in the form of bacteria, and $CO_2$.

Secondary treatment provides an environment of adequate temperature, volume, mixing, and oxygen, or the absence of oxygen in anaerobic processes, to sustain the bacterial population necessary to consume the BOD and nutrients remaining in the waste water after primary treatment. New organic matter enters the treatment facility continuously so a portion of the existing bacterial population is removed from the process to promote the growth of new bacteria. The effectiveness of primary treatment directly affects secondary process or the receiving body of water if discharged from the collection system.

Primary clarifiers or settling basins are recognized as being the most economical means to reduce BOD as there is little energy required and no biomass to maintain. Primary treatment creates no biomass and therefore requires no aeration energy; no process controls to monitor the biomass to determine the health of the biomass; no separation or removal of bacteria by moving to a side-stream digester; no aeration of the digester; and no dewatering and disposal of surplus bacteria, also called secondary sludge. The lack of complexity of primary treatment is well suited for developing nations to promote recovery of surface waters and aquifers, resulting in a reduction in health issues.

Existing primary clarifiers may be circular or rectangular tanks and are volumetrically and geometrically sized to provide a horizontal fluid velocity lower than the solids settling velocity. The horizontal travel time and distance of the liquid from the inlet to the effluent weir or decanter must be greater than the settling time and distance of the suspended solids so that solids settle out prior to reaching the effluent weir or decanter. These settled solids contain a majority of the BOD in raw sewage. The effectiveness of this first stage is important because the more solids that exit the primary clarifier, the lower the BOD entering the secondary treatment process or the effluent-receiving body of water.

The '197 Application discloses an improved screen decanter with an ultrafine screen (also referred to herein as a screen box or "SBX") in the form of a box, oval, or cylinder that is controllably driven in the vertical direction to optimize the exposure of the screen to varying wastewater levels and that can be lifted from the wastewater for backflushing and sterilization in a dedicated overhead apparatus. Because the motion of the screen assembly is only vertical, the required footprint in the tank can be relatively small. An air scour header provides air bubbles to air scour the screen surface. The application further discloses a low profile screen box useful for wastewater systems having high flows, limited surface area to place a screen box, and/or shallow active tank volumes of existing primary clarifiers, where multiple screen boxes or racks may be ganged in parallel to provide the necessary screen surface area at a controlled screen loading rate.

The '197 Application further discloses a deflector plate that increases the horizontal travel distance to the screen surface for solids that may be disturbed and start to move towards the screen.

A baffled lifting column and combined stub effluent drain pipe for an SBX are also disclosed in the '197 Application. The baffled lifting column is a slotted or perforated circular pipe that is connected to an effluent pipe or hose below the weir or dcanter. The lifting columns are centered in the SBX with openings to encourage flow distribution through the screen. A long rectangular screen rack has 3 lifting columns centered and equally spaced in the screen racks. Preferably, the open area of the baffled lifting column is lowest at the bottom and increases with elevation, creating head loss at the lower portion of the lifting column to equalize travel distance and pressure, and thus to equalize flow through the screen from the lowest point to the highest point of liquid contact.

An apparatus and method for simply and automatically preventing fouling of the upstream surface of any screen assembly is disclosed by the '247 Application.

In continued use of fine-screen apparatus in wastewater treatment, it is important to address potential fouling and blockage of the screening as a potential operational problem that can lead to inefficiency because of time lost to clean and/or replace clogged screens. Additional maintenance issues are typical in prior art operations, especially in high flow-volume situations such as municipal waste water treatment plants.

What is needed in the art is an improved screen decanter that maximizes decanter throughput by increasing flow uniformity and hence total flow through the screen element and that increases operational efficiency by increasing the time interval between required screen cleanings and/or screen replacements.

It is a principal object of the invention to maximize flow rate and volume of waste water effluent through a wastewater treatment system without fouling decanter screens prematurely or increasing the overall footprint of a screen box assembly, and thus without increasing the overall footprint of the primary treatment facility.

To enable this principle, it is a further object of the invention to control the waste water flow through a screen decanter so that all portions of all screens experience approximately the same flow rate, thus minimizing localized, high-peak flow regions that can clog portions of fine screens, and maximizing decanter throughput.

SUMMARY OF THE INVENTION

The present invention is directed to apparatus and method wherein an improved screen decanter in a waste water treatment system is provided with screens and drain standpipes configured to maximize total flow rate through the screens by equalizing flow rates through unit areas of the screens at all immersed levels.

In accordance with one embodiment of the present invention, a screen decanter comprises a rack including a frame; a plurality of screens attached to the frame and positioned to define opposite sides of a cavity; baffles attached to the frame and positioned to define two additional opposite sides of the cavity; and at least one perforated drain standpipe disposed within the cavity. Preferably, the screens have pores with a diameter between 25 micrometers and 75 micrometers, most preferably about 50 micrometers. The screen decanter provides a barrier to solids larger than the employed porosity so that liquid passes from the settling tank into the cavity exclusively through the screens. Filtered liquid is drained from the cavity through a pattern of openings along the length of the drain standpipe. The pattern is configured to counteract the range of hydraulic head within the cavity to provide essentially equal flow through the screen and drain standpipes at all depths of immersion. End baffles, pipe positions, and angles that the pipe perforations face, work together to further even out horizontal flow patterns that complement the aforementioned uniform flow at various depths within the cavity.

BRIEF DESCRIPTION OF THE DRAWINGS

The present invention will now be described, by way of example, with reference to the accompanying drawings, in which:

FIGS. 3-9 are elevational views of alternate configurations of perforations in a drain standpipe.

DETAILED DESCRIPTION OF THE INVENTION

Throughout the following description, specific elements are set forth in order to provide a more thorough understanding of the invention. However, in some embodiments the invention may be practiced without some of these elements. In other instances, well known elements have not been shown or described in detail to avoid unnecessarily obscuring the disclosure. Accordingly, the specification and drawings are to be regarded as illustrative rather than restrictive. It is to be further noted that the drawings may not be to scale.

Figure 1:
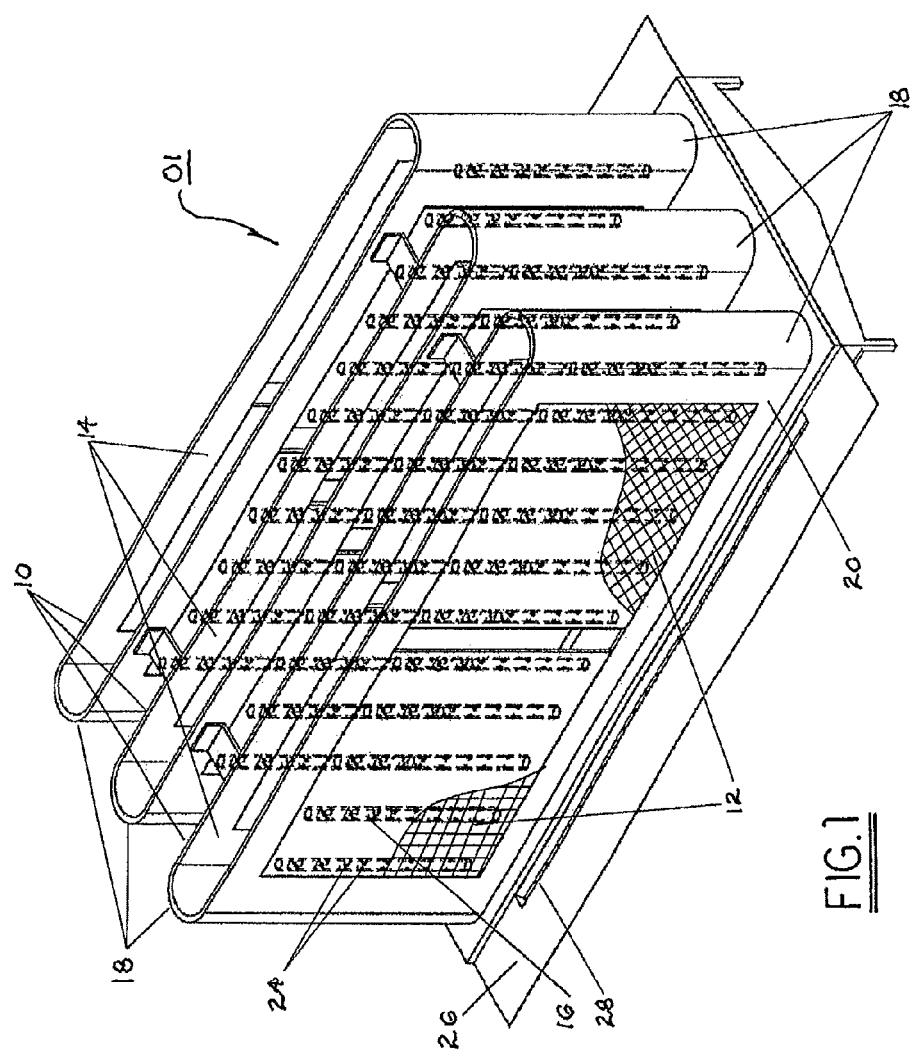
FIG. 1 is a first isometric view from above of an embodiment of a screen decanter (SBX) in accordance with the present application.
Figure 2:
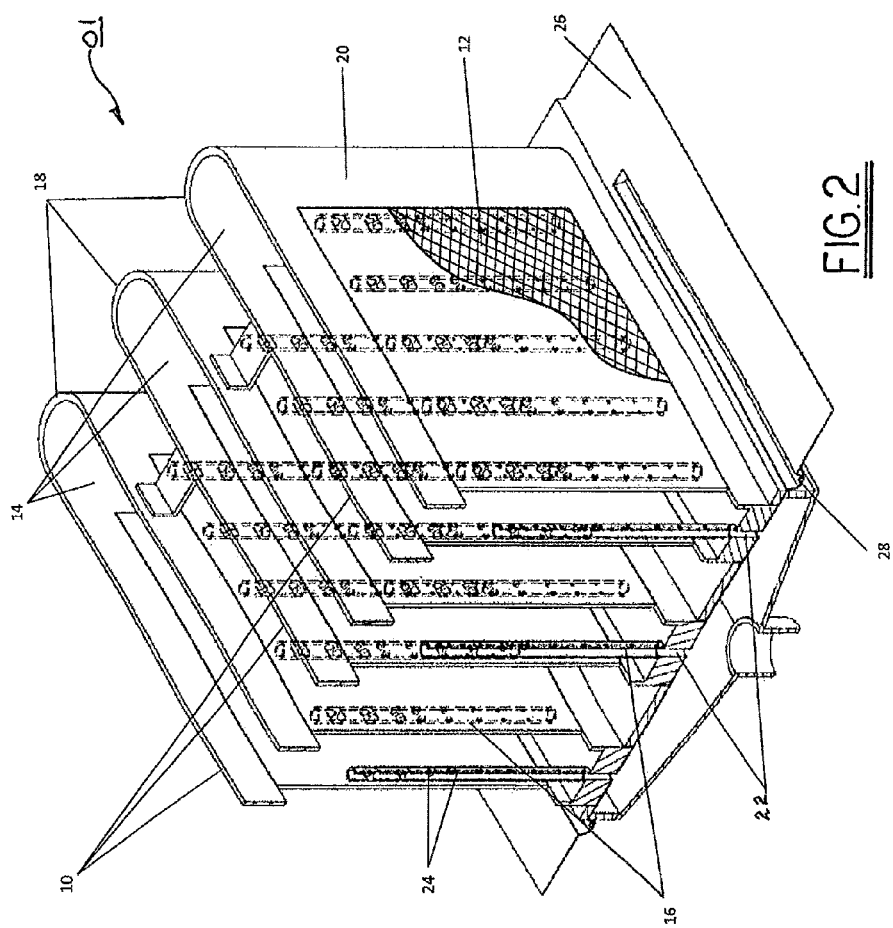
FIG. 2 is a second isometric view in partial cutaway of the screen decanter shown in FIG. 1.

Referring now to FIGS. 1 and 2, a preferred embodiment 01 of a screen decanter in accordance with the present application comprises at least one rack 10, with the embodiment shown comprising three racks 10. Each rack 10 comprises first and second screens 12 forming opposite sides of a cavity 14 within which one or more drain standpipes 16 are disposed to draw waste water through screens 12. A pattern of openings along the length of each of the drain standpipes 16 is formed to counteract the range of hydraulic head within the cavity to provide essentially equal flow through the screen and drain standpipe at all depths of immersion of the screen. Exemplary patterns of openings are shown in FIGS. 3-9 and are described in greater detail below.

Screens 12 are preferably mounted as coplanar pairs, two to a side, and repeated on opposite sides of each cavity. The screens on opposite sides of cavity 14 are parallel and in a currently preferred embodiment are eight inches apart, although size and spacing of screens 12 may vary depending on the application. To promote uniform flow of liquid between racks 10, the racks also are preferably eight inches apart. In a preferred embodiment, the screens 12 are ultrafine screens with pores that are approximately 50 micrometers in diameter.

Baffles 18 are positioned at the ends of the cavity 14 defined by the screens 12. In a preferred embodiment, the baffles 18 are semi-elliptical, with the combination of screens 12 and baffles 18 defining cavity 14 with an elongate base and parallel sides. This shape of screens and baffles smoothes out the flow of waste water in the vicinity of rack 10 in a manner that minimizes turbulent flows in the vicinity of the ends. A frame 20, attached to and supporting the screens 12 and baffles 18, forms the bottom and the remaining sides of the rack 10 and provides a barrier so that liquid passing from outside, of the rack 10 into the cavity 14 passes exclusively through the screens 12 during decanting.

In operation, a currently preferred vertical placement of the screen decanter 01 relative to the surface of liquid in a tank in a waste water treatment system is such that the screen decanter is submerged only to the depth necessary to bring liquid approximately to the top of the screens 12 but no further, to prevent unfiltered fluid from spilling over the top of the frame 20 into cavity 14.

Referring to FIGS. 1-2, at least one drain opening 22 is located at the bottom of cavity 14 through which liquids may flow from cavity 14.

At least one drain apparatus 16, currently preferred as a cylindrical standpipe, is located inside the cavity 14 within the rack 10, forming a channel for the flow of liquid from inside the cavity 14 to drain opening 22. In a preferred embodiment, several such drain standpipes 16 comprising tubes of constant diameter are evenly spaced within the rack 10 to promote uniform flow of liquid through each screen 12. In a preferred embodiment, the drain standpipes 16 are positioned on or near a line down the center of the rack 10. Fluid dynamic modeling shows that the combination of curved end baffles 18, parallel coplanar screens 12, and evenly spaced patterned drain standpipes 16, all being properly dimensioned for the chosen operating conditions, provides uniform flow of effluent through screens 12 across the width and height thereof.

Referring to FIGS. 3-10, various patterns of openings 24 (holes 24a, vertical slots 24b, tapering or of variable length horizontal slots 24c, and screening 24d) are shown. The cross-sectional areas of the openings 24 increase with increasing height along the length of the drain pipe 16 to promote uniform flow top to bottom of each screen 12 by counteracting the hydraulic head of filtered effluent within cavity 14.

Referring to FIG. 7, in a presently preferred embodiment, a plurality of circular openings 24a of differing diameter are vertically spaced along the length of each drain standpipe 16, graduated by height to receive decanted fluid, and increasing in diameter, with smaller diameter holes 24a at the bottom and larger diameter holes 24a at the top, promoting uniform flow vertically across each screen 12.

Figure 10:
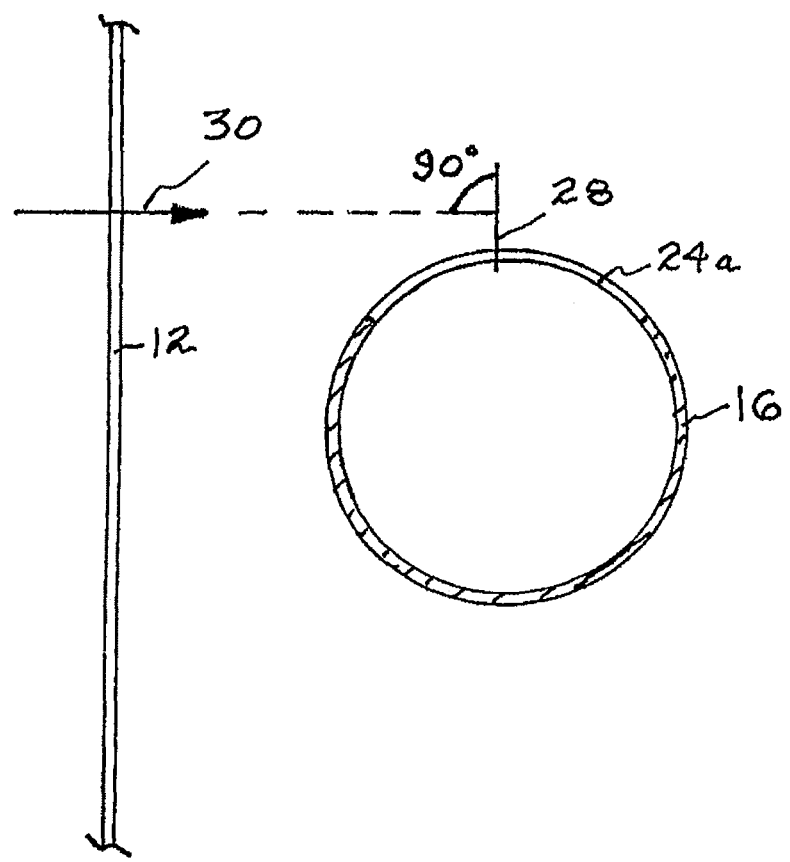
FIG. 10 is a schematic horizontal cross-sectional view of a portion of a screen decanter showing a currently preferred orientation of a drain standpipe having a pattern of perforations with respect to the direction of effluent flow through a decanter screen.

Referring to FIG. 8, in an alternate embodiment, a plurality of circular openings 24a of approximately the same diameter are vertically spaced along the length of each drain standpipe 16, with the cross-sectional area of the perforations 24 increasing vertically with increasing height along the length of the pipe 16 (i.e., with the number and/or diameter openings 24a generally increasing with increasing height along the length of the drain pipe 16). As shown in FIG. 10, in a currently preferred embodiment, the centerline 28 of openings 24a is generally oriented at approximately ninety degrees (normal) to the direction of effluent flow 30 through the screens 12; that is, the openings do not face the screens 12 directly, promoting uniform flow horizontally through each screen 12. The diameter and orientation of the drain standpipes 16 is such that they create minimal turbulence within the rack 10 during decanting.

Referring further to FIGS. 1 and 2, in a preferred embodiment, screen decanter 01 further comprises a deflector plate 26 disposed at the bottom of racks 10 to suppress vertical motion of liquid in a tank below the decanter 01, in effect preventing larger previously-settled BOD particles from moving up in the tank and fouling the screens 12.

In a preferred embodiment, an air plenum 28 is attached to a lower region of each frame 20, each air plenum 28 being supplied from a source of compressed gas and also provided with exit slots 30 so that gas bubbles exiting the air plenum 28 through the exit slots 30 flow along, near, and through the surfaces of the screens 12 of the screen box assembly to scour and clean the screens 12.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A screen decanter for screening solids from waste water in a waste water treatment system comprising:
    a) a three-dimensional structure partially immersible in said waste water and including a bottom, sides, and an open top defining a rack;
    b) at least one screen element forming at least a part of said sides; and
    c) a drain apparatus disposed in a first opening in said bottom for draining liquid from within said structure, wherein said three-dimensional structure is sealed such that all liquid entering said structure passes through said screen element,
    wherein said decanter in use sustains a hydraulic head within said structure bearing against a portion of said drain apparatus, and
wherein said drain apparatus includes a plurality of second openings arranged in a pattern along the length and partial circumference of said drain apparatus so formed as to counteract the range of said hydraulic head to provide essentially equal flow rates through said screen and drain apparatus at all depths of immersion of said screen decanter in said waste water.

2. A screen decanter in accordance with claim 1 wherein said rack includes first and second spaced-apart screens defining first and second opposing sides.

3. A screen decanter in accordance with claim 2 comprising a plurality of said rack.

4. A screen decanter in accordance with claim 3 wherein said plurality of racks are disposed in side-by-side spaced-apart ranks.

5. A screen decanter in accordance with claim 2 wherein said drain apparatus includes a standpipe and wherein said screen decanter comprises a plurality of said drain standpipe disposed respectively in a plurality of first openings in said structure bottom.

6. A screen decanter in accordance with claim 3 further comprising a deflector plate disposed at the bottom of said plurality of racks.

7. A screen decanter in accordance with claim 1 wherein said screen element has pores that are between about 25 micrometers and 75 micrometers in diameter.

8. A screen decanter in accordance with claim 1 wherein the shape of said second openings is selected from the group consisting of horizontal slots, vertical slots, circular, and openings arranged in a pattern to form a screen.

9. A screen decanter in accordance with claim 1 wherein a centerline of said pattern of second openings is oriented normal to said screen element.

10. A screen decanter in accordance with claim 1 further comprising a slotted air plenum disposed adjacent said screen element.

* * * * *